United States Patent [19]
Motose

[11] Patent Number: 5,967,862
[45] Date of Patent: Oct. 19, 1999

[54] ENGINE CONTROL FOR PLANING BOAT

[75] Inventor: Hitoshi Motose, Hamamatsu, Japan

[73] Assignee: Yamaha Hatsudoki Kabushiki Kaisha, Iwata, Japan

[21] Appl. No.: 09/093,260

[22] Filed: Jun. 8, 1998

[30] Foreign Application Priority Data

Jun. 6, 1997 [JP] Japan ......................................... 149202

[51] Int. Cl.$^6$ .................................................. B63H 21/22
[52] U.S. Cl. .................................... 440/1; 440/84; 440/89
[58] Field of Search ............................. 440/1, 2, 84, 85, 440/86, 87, 88, 89, 900

[56] References Cited

U.S. PATENT DOCUMENTS 5,827,096  10/1998  Mineo ........................................ 440/89
5,885,122   3/1999  Fujimoto .................................... 440/89

Primary Examiner—Stephen Avila
Attorney, Agent, or Firm—Knobbe, Martens, Olson & Bear LLP

[57] ABSTRACT

An engine control for a planing-type boat having an engine powering a water propulsion unit is disclosed. The engine has an exhaust port leading from a combustion chamber for routing exhaust products therefrom and an exhaust timing valve cooperable with the exhaust port and movable between a first position for delaying the closing of said exhaust port and a second position for advancing the closing of said exhaust port. A valve control mechanism is provided for moving the valve. The engine control is arranged to control the position of the exhaust timing valve with the valve control mechanism. The engine control is arranged to move the valve towards the first position when acceleration of the engine is detected and a speed of the boat is below a planing speed.

14 Claims, 6 Drawing Sheets

ENGINE CONTROL FOR PLANING BOAT

FIELD OF THE INVENTION

The present invention relates to an engine control for an engine of the type used to power a planing-type boat. More particularly, the invention is an engine control for controlling an exhaust timing valve of such an engine.

BACKGROUND OF THE INVENTION

Internal combustion engines include exhaust control mechanisms for controlling the flow of exhaust from each combustion chamber of the engine. In most instances, these mechanisms comprise valves.

In those instances where the engine operates on a two-stroke or two-cycle principal, the valve is often of the sliding or rotating type. Generally, this type of valve does not serve to ever completely close the opening or port in the combustion chamber wall or the exhaust passage. Instead, the valve moves between a first position in which the valve does not obstruct or obstructs very little of the exhaust port, and a second position in which the valve partly obstructs the port. In the first position, the timing of the opening of the exhaust port as the piston moves down is advanced, and the timing of the closing of the exhaust port as the piston moves up is delayed, providing for a longer exhaust duration as compared to that when the exhaust timing valve is in the second position. By moving the exhaust timing valve between its first and second positions or positions therebetween, the timing and duration of the exhaust flow, and thus the performance or running conditions of the engine, can be adjusted.

A problem arises when an engine having this type of valve is used to power a planing type boat. This type of boat is arranged so that below a certain speed, the hull displaces a great deal of water as it moves through the water. Above a certain speed, however, the boat rises out of the water into a "planed" condition. In this planed condition, less of the hull is positioned in the water.

As may be appreciated, when the boat moves from the non-planed to the planed condition, the hull resistance decreases substantially, lowering the load on the motor. Of course, as the speed of the boat continues to increase in the planed condition, the hull resistance rises and at some point may actually be higher than that before the boat moved to its planed condition.

The exhaust timing valve of this type of engine is conventionally operated in the following manner. When the boat is being operated at speed below a predetermined high speed (this speed normally being higher than the speed at which the boat planes), the exhaust valve is moved to its substantially closed position. In this position, the compression ratio and combustion time are increased, providing high engine power and torque.

When the boat speed increases above the predetermined high speed, the engine speed must similarly be increased. At this time, the exhaust valve is moved to its open position. In this position the exhaust gases flow more freely from the combustion chamber, lowering exhaust resistance and permitting higher engine speeds.

The problem arises that this exhaust control strategy presents problems when the operator of the boat wishes to accelerate the boat quickly from the non-planing state to the planing state. When the exhaust timing valve is closed, quick acceleration of the engine is inhibited by the exhaust gas resistance.

An engine control for an engine powering a planing-type boat which overcomes the above-stated problems is desired.

SUMMARY OF THE INVENTION

In accordance with the present invention, there is provided an engine control for a planing-type boat having an engine powering a water propulsion unit.

The engine has an exhaust port leading from a combustion chamber for routing exhaust products therefrom and an exhaust timing valve cooperable with the exhaust port. The exhaust timing valve is movable between a first or open position for delaying the closing of said exhaust port and a second or closed position for advancing the closing of said exhaust port. The engine also includes means for moving the valve.

The engine control is arranged to control the position of the exhaust timing valve with the means for moving. The engine control includes means for detecting a condition of engine acceleration and is arranged to move the valve towards the first position when the means for detecting a condition of acceleration detects acceleration and a speed of the boat is below a planing speed.

In one embodiment, the engine control includes a map for controlling the position of the valve when the engine is not accelerating, and includes a means for adding a compensating amount to the map position when the engine is accelerating. During acceleration, the engine control moves the exhaust timing valve to the position corresponding to the map position plus the compensating amount.

In a second embodiment, the engine control includes a first map for controlling the position of the valve when the engine is not accelerating and a second map for controlling the position of the valve when the engine is accelerating. In accordance with this embodiment, the valve is preferably not moved towards its open or first position even when acceleration is detected unless the engine speed has reached a predetermined speed.

Further objects, features, and advantages of the present invention over the prior art will become apparent from the detailed description of the drawings which follows, when considered with the attached figures.

DETAILED DESCRIPTION OF THE PREFERRED EMBODIMENTS OF THE INVENTION

The present invention is an engine control for an engine powering a planing type boat such as a personal watercraft. The engine control of the present invention is described for use in controlling an exhaust timing valve of an engine used in powering a planing type boat since this is an application for which the control has particular utility. Those of skill in the art will appreciate that the control may be used in a variety of other applications.

Figure 1:
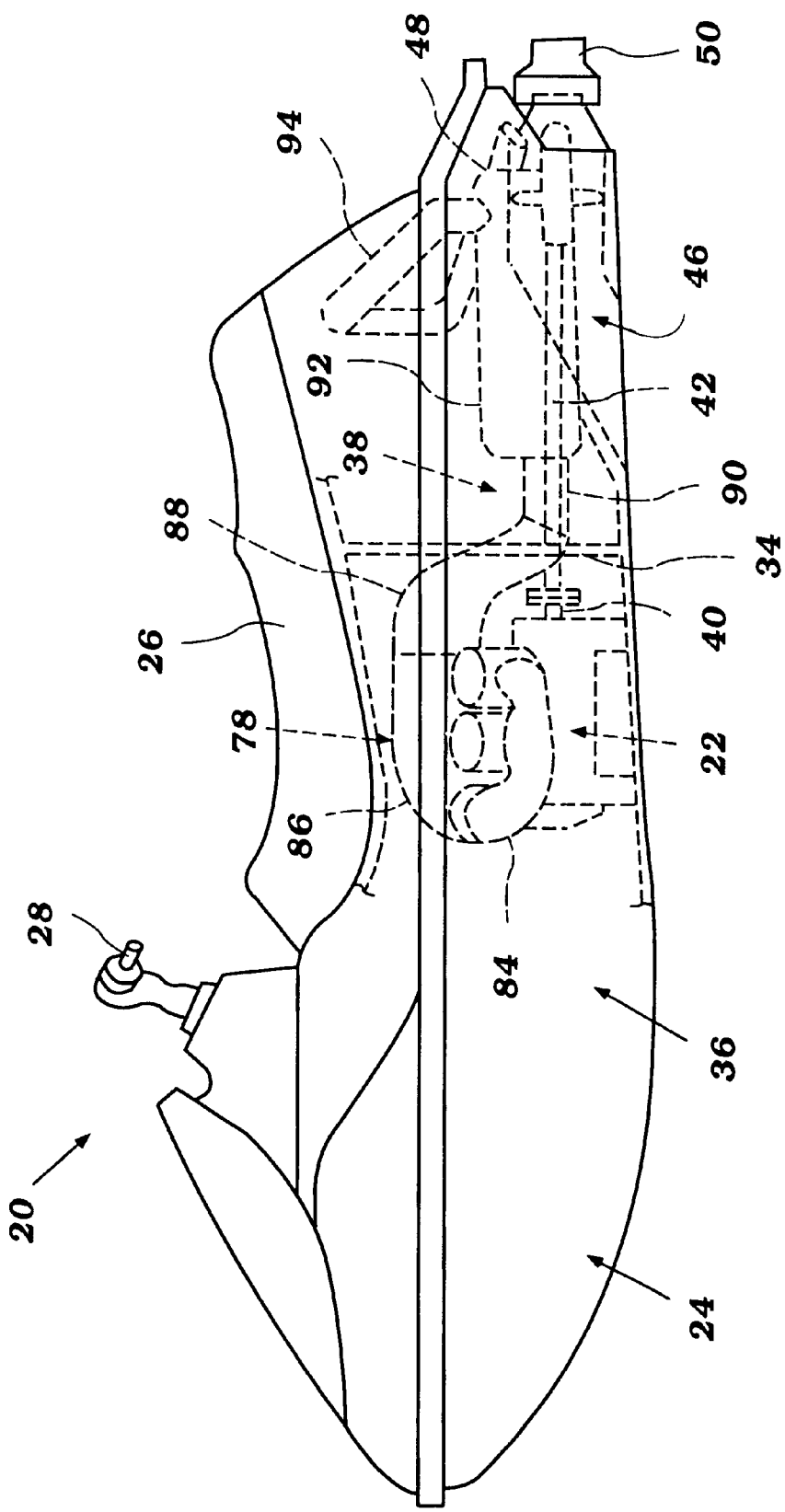
FIG. 1 is a side view of a personal watercraft of the type powered by an engine having an engine control in accordance with the present invention, the engine and other watercraft components positioned within the watercraft illustrated in phantom.
Figure 2:
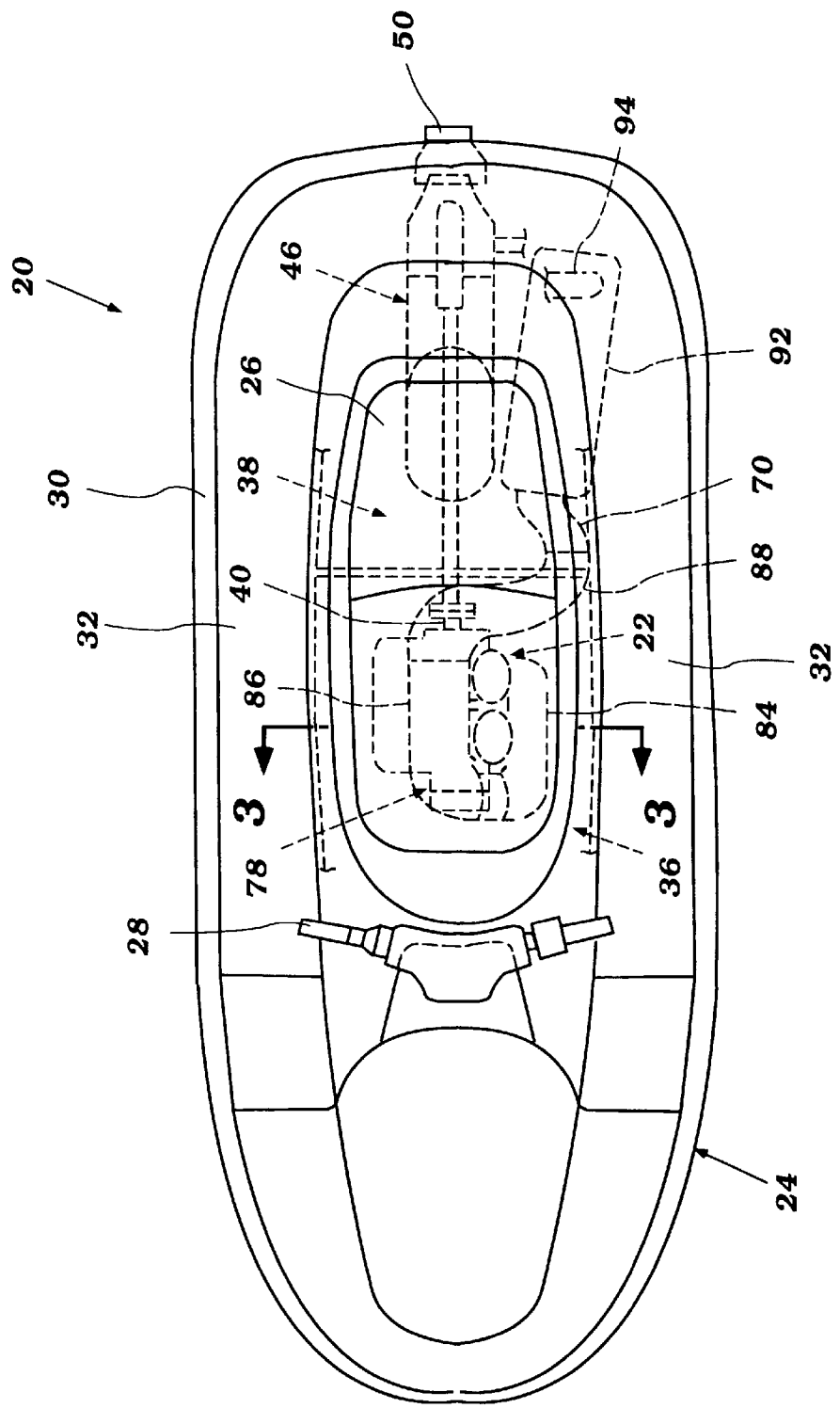
FIG. 2 is a top view of the watercraft illustrated in FIG. 1, with the engine and other watercraft components positioned within the watercraft illustrated in phantom.

FIGS. 1 and 2 illustrate a planing type boat, namely a personal watercraft 20. Those of skill in the art will appreciate that the invention is useful with other types of planing-type boats.

The watercraft 20 has a hull 24. A seat 26 is positioned on a top portion of the hull 24. The seat 26 is preferably connected to a removable deck member. A steering mechanism 28 is provided adjacent the seat 26 for use by a user in directing the watercraft 20.

As best illustrated in FIG. 2, a bulwark 30 extends upwardly along each side of the watercraft 20. A foot step area 32 is defined between the seat 26 and its adjacent bulwark 30. The hull 24, along with a bulkhead 34, defines an engine compartment 36 and a pumping chamber 38. An engine 22 is positioned in the engine compartment 36. The engine 22 is preferably partially accessible through a maintenance opening accessible by removing the removable deck member on which the seat 26 is mounted.

The engine 22 has a crankshaft 40 which is in driving relation with an impeller shaft 42. The impeller shaft 42 rotationally drives a means for propelling water of a propulsion unit 44. Referring to FIG. 1, the propulsion unit 44 includes a propulsion passage 46 having an intake port which extends through the lower portion of the hull 24. The means for propelling water preferably comprises an impeller 48 positioned in the passage 46.

The impeller 48 draws water from the body of water in which the watercraft 20 is positioned into the intake port and expels it through an outlet at the stem or rear of the watercraft 20. Preferably, a nozzle 50 is movably mounted at the outlet for directing the water which is expelled therefrom. The nozzle 50 is linked to the steering mechanism 28, whereby the operator of the watercraft 20 may move the nozzle 50, directing the water expelled through the outlet, thus guiding the watercraft 20.

Figure 3:
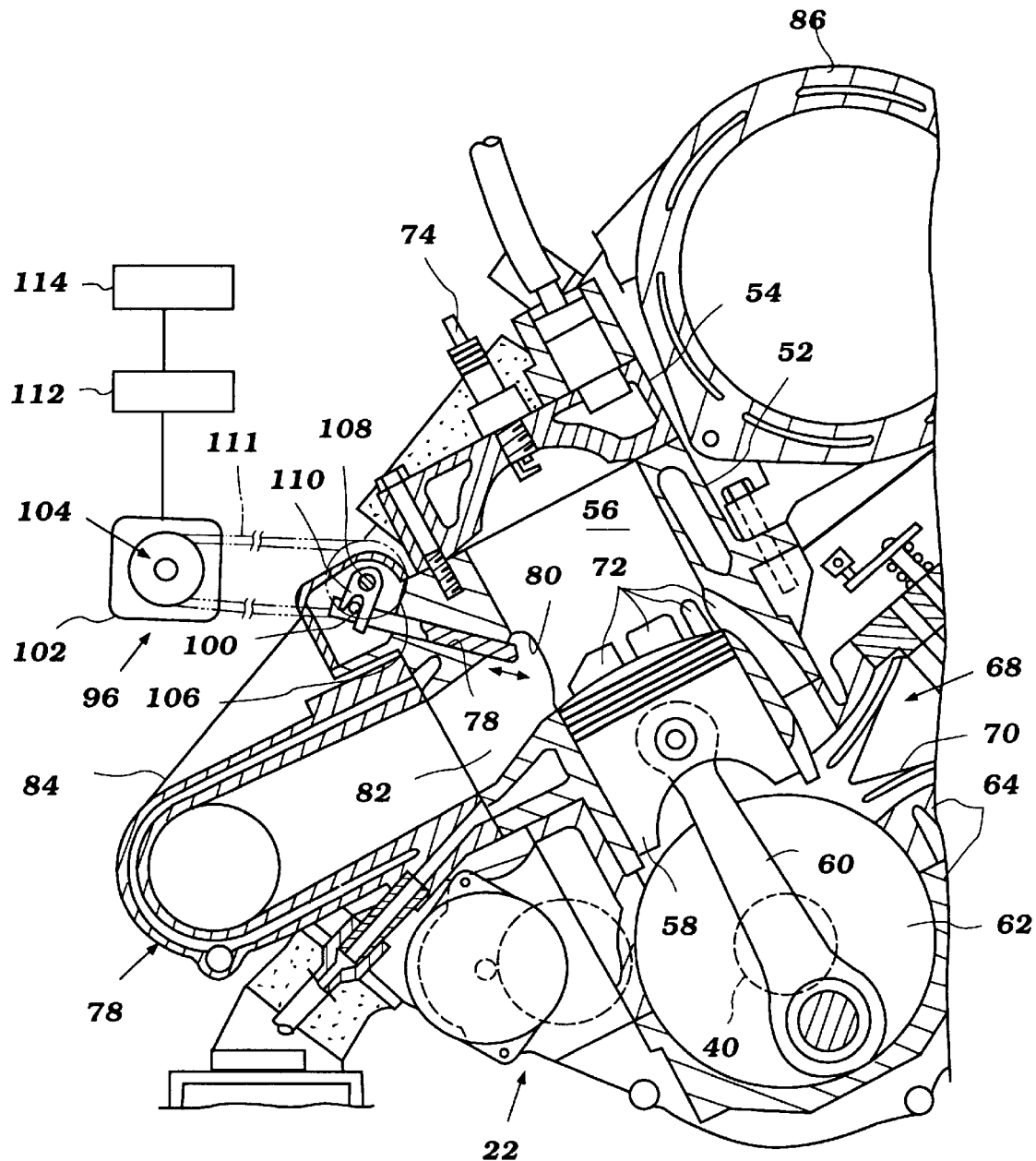
FIG. 3 is a cross-sectional view of a portion of the engine illustrated in FIG. 2, taken along line 3—3 therein, illustrating the engine and an exhaust timing valve and valve control thereof.

The engine 22 is best illustrated in FIG. 3. As illustrated therein, the engine 22 is preferably of the two-cylinder, two-cycle variety. Of course, the engine 22 may have as few as one, or more than two, cylinders and operate in accordance with other operating cycles, as may be appreciated by one skilled in the art.

The engine 22 includes a cylinder block 52 having a cylinder head 54 connected thereto and cooperating therewith to define two cylinders 56. A combustion chamber is defined by a cylinder wall within the block 52, a recessed area in the cylinder head 54 and a top of a piston 58. The piston 58 is movably mounted in the cylinder 56 and connected to the crankshaft 40 via a connecting rod 60, as is well known in the art.

The crankshaft 40 is rotatably journalled by a number of sealed bearings with respect to the cylinder block 52 within a crankcase chamber 62. Preferably, the chamber 62 is defined by a crankcase cover member 64 which extends from a bottom portion of the cylinder block 52. The crankshaft 40 has pin portions extending between web portions with each connecting rod 60 connected to one of the pin portions.

As illustrated partly in FIG. 3, the engine 22 includes means for providing an air and fuel mixture to each cylinder 56. Preferably, an intake system is provided for delivering air for combustion to the engine. The intake system draws air from within the engine compartment 36 (the air entering the engine compartment through one or more air inlets in the hull 24) into a silencer (not shown) and delivered through a carburetor (not shown).

Fuel is provided to the incoming air. In particular, fuel is drawn from a fuel supply (such as a fuel tank, not shown) by a fuel pump (not shown), and delivered through a fuel delivery line to the carburetor. A throttle valve (not shown) is preferably positioned along the intake path between the engine 22 and the carburetor for allowing the watercraft operator to control the rate of fuel and air delivery to the engine 22 for controlling the speed and power output of the engine via a throttle linkage. It is contemplated that the fuel may be provided by indirect or direct fuel injection, as well as via carburation, as known in the art.

The air and fuel mixture selectively passes through an intake port 68 into the crankcase chamber 62 as controlled by a reed valve 70, as is known in the art. As is also well known, an intake port 68 and corresponding reed valve 70 are preferably provided corresponding to each cylinder 56. The crankcase chamber 62 is compartmentalized so as to provide the crankcase compression feature for each combustion chamber as is well known in the operation of two-cycle engines.

The fuel and air charge within the crankcase chamber 62 is delivered to each cylinder 56 through several scavenge passages 72 leading to a number of scavenge ports in the cylinder wall.

A suitable ignition system is provided for igniting the air and fuel mixture provided to each combustion chamber. Preferably, this system comprises a spark plug 74 (see FIG. 3) corresponding to each combustion chamber and an appropriate ignition system control for use in controlling the firing of the ignition elements 74.

The engine 22 may include a lubricating system which provides lubricating oil to the various moving parts thereof. Such a system may include an oil tank or reservoir (not shown) from which lubricating oil is delivered and circulated throughout the engine, including for mixing with the fuel which is supplied to the engine, as is well known to those skilled in the art.

The engine 22 also preferably includes a suitable cooling system. Preferably, the cooling system is a liquid cooling system which draws cooling water from the body of water in which the watercraft 20 is being operated and circulates it through various cooling water jackets in the cylinder block 52, head 54, and the like.

Exhaust gas generated by the engine 22 is routed from the engine to a point external to the watercraft 20 by an exhaust system 78 which includes an exhaust passage or port 80 in the cylinder wall. An exhaust passage 82 extends from the port 80 through the cylinder head 54. An exhaust manifold 84 is connected to a side of the engine 22. The manifold 84 has a pair of branches with passages leading therethrough aligned with the two passages 82 leading through the cylinder head 54. The pair of passages defined by the manifold 84 merge into a single passage through the manifold 84.

After the branches of the manifold 84 merge, the manifold curves around the front end of the engine 22. An expansion pipe 86 is connected to the exhaust manifold 84, preferably via a flexible sleeve. The expansion pipe 86 has an enlarged passage or chamber 88 through which exhaust routed from merge passage in the exhaust manifold 84 flows. As illustrated in FIG. 3, the expansion pipe 86 preferably extends along the top of the engine 22 in the direction of the front to the rear of the watercraft 20. A catalyst (not shown) may be positioned within the expansion pipe 86.

After flowing through the expansion pipe 86, the exhaust flows into an upper exhaust pipe section 88 of the exhaust system. This portion of the exhaust system is tapers to a smaller diameter from that of the expansion pipe 86. This exhaust pipe 88 leads to a water lock 92. The upper exhaust pipe 88 is preferably connected to the water lock 92 via a flexible fitting 90, such as a rubber sleeve. The exhaust flows through the water lock 92, which is preferably arranged as known to those skilled in the art to prevent the flow of water through the exhaust system towards the engine 22, and then passes to a lower exhaust pipe 94 arranged to discharge the exhaust into the body of water in which the watercraft 20 is operating.

Means are provided for controlling the timing of the flow of exhaust gases through each exhaust passage 82 from the cylinder 56. Preferably this means comprises an exhaust timing control device 96. The exhaust timing control device 96 comprises a sliding knife-type exhaust timing valve 98 and means for moving the valve.

As illustrated in FIG. 3, the valve 98 has a generally flat or plate-like body having a first end positioned in the passage 82 at the exhaust port 80, and a pin 100 positioned at the other end. The valve 98 is arranged to move between a first retracted or "open" position in which the valve 98 does not generally obscure the passage 82, and a second extended or "closed" position in which the valve obscures a portion of the passage 82. When in its retracted position, the valve 98 may said to be in an "advancing" position, since the timing of the flow of exhaust from the cylinder occurs soon as the piston 58 moves downwardly in the cylinder. In this position, the timing of the closing of the passage 82 as the piston 58 moves up is delayed. On the other hand, when in the extended position, the valve 98 may be said to be in a "retarding" position, since the flow of exhaust from the cylinder is delayed since the piston must move farther down the cylinder before the passage 82 is opened. In this same position, the timing of the closing of the passage 82 as the piston 58 moves up is advanced. Of course, the valve 98 may be moved to a variety of positions between the first and second positions.

The means for moving the valve 98 preferably comprises a motor 102 arranged to move the pin 100 connected to the valve 98. As illustrated, a linkage links the motor 102 and the pin 100. The linkage preferably comprises a drive pulley 104 driven by the motor 102, a driven pulley 106 rotatably mounted to the engine 22 near the valve 98 by a pin 108, a drive element 111 extending between the pulleys 104,106 and a slotted drive element 110 connected to the driven pulley 106. The pin 100 of the valve 98 extends into the slot of the drive element 110, whereby rotation of the driven pulley 106 causes movement of the valve 98.

In the situation where the motor 102 is powered in only one direction, the valve 98 is preferably arranged to be biased, such as with a spring to its first position. In that instance, the motor 102 is arranged to counteract the spring and move the valve 98 into a variety of positions between its first and second positions.

Although the drive mechanism for only one of the two valves 98 of the engine 22 is illustrated in FIG. 3, the other valve is, of course, similarly driven. As will be appreciated by those of skill in the art, the same motor 102 may be arranged to drive the other valve, or an entirely separate drive motor and linkage may be utilized.

In accordance with the present invention, an engine control including an exhaust timing valve control 112 is provided for controlling the movement of the valve 98 via the motor 102 or other valve-driving mechanism. The engine control may also be arranged to control other aspects of the engine, such as the ignition element 74 firing timing and the like.

Figure 4A:
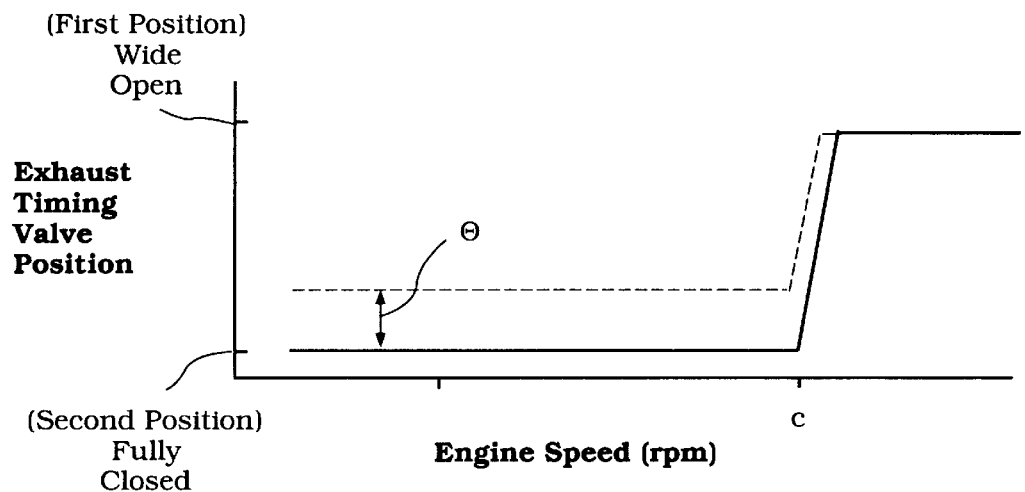
FIG. 4(a) is a graph illustrating an exhaust timing valve control strategy using the engine control in accordance with a first arrangement of the invention.

In a first embodiment of the invention, the engine control including the exhaust timing valve control 112 includes an exhaust timing valve control map and an accelerating detecting mechanism 114. The control map will be described with reference to FIGS. 4($a$) and ($b$). As illustrated in FIG. 4($b$), a first line X represents the engine output (power) for an engine having its exhaust valve in the closed position at all times. A second line Y represents the engine output for an engine having its exhaust valve in the open position at all times. As illustrated, the engine power is higher for the engine having its exhaust valve closed up to an engine speed c. Therefore, the control map is preferably arranged so that the exhaust timing valve is closed up to a detected engine speed c, and thereafter the exhaust valve is quickly opened. The exhaust timing valve position vs. engine speed in accordance with this control strategy is illustrated in FIG. 4($a$).

Thus far described, the control strategy is of a standard arrangement. In accordance with the present invention, and as illustrated in FIG. 4($a$), in the event a condition of engine acceleration is detected and the exhaust timing valve is in its closed position, the exhaust timing valve 98 is opened by a compensation amount $\theta$. In the preferred arrangement, this compensation opening amount $\theta$ is a value which is added to a standard opening value obtained from the control map. For example, the amount $\theta$ may be 15 degrees. If at a certain time the valve 98 is opened by an amount of 0 degrees (i.e. is closed) and a condition of acceleration is detected, then the valve would be opened to 15 degrees.

Preferably, the engine control is arranged to move the exhaust timing valve 98 towards the open position, even when acceleration is detected, only if the engine speed is less than an engine speed corresponding to the planing speed of the watercraft 20. In this regard, the engine control preferably includes a means for detecting engine speed and for comparing that speed to a map of speeds corresponding to watercraft 20 positions. Of course, the speed or position of the watercraft 20 could be directly measured to determine whether it is in a planed or non-planed condition.

The opening amount $\theta$ is preferably chosen to be an amount which causes the valve 98 to be moved to a desired open position during a condition of acceleration (i.e. the dotted "target" line in FIG. 4($a$)).

This arrangement has the advantage that a single valve control map may be used for all conditions of engine 22 operation with the need to provide a separate control loop only to add the compensation amount $\theta$ to the opening value upon detection of a condition of acceleration. By avoiding the need for an entirely separate map for the position of the valve 98 under acceleration, the memory associated with the control may be kept small and less expensive.

In the above-described arrangement, the condition of acceleration is preferably detected by the detection mechanism 114. For example, a condition of acceleration may be determined by the position of a throttle control or by the speed of the engine 22 as measured with an engine speed sensor of a type known to those of skill in the art.

Figure 5A:
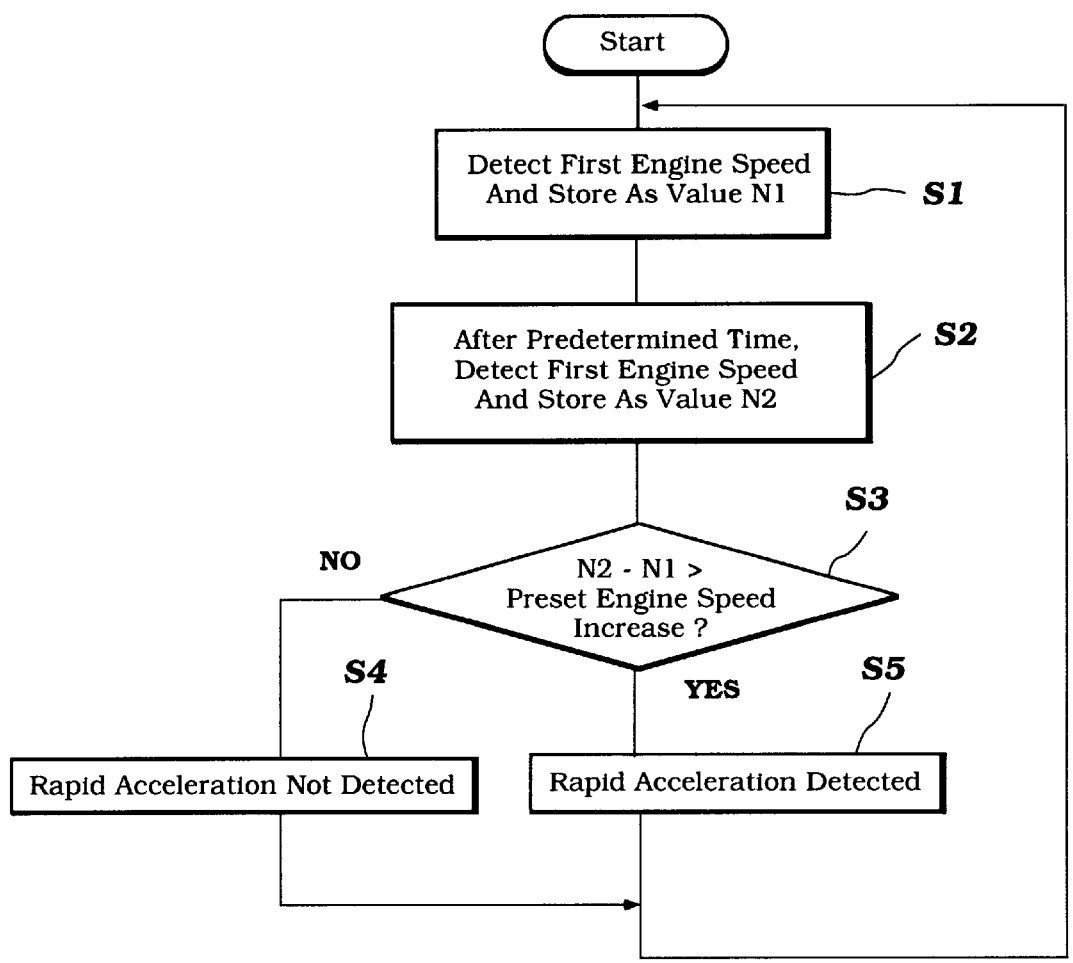
FIGS. 5(a) and (b) are flow diagrams of an exhaust timing valve control strategy in accordance with the present invention.

One embodiment of an acceleration detection mechanism 114 is illustrated in FIG. 5(a). As illustrated therein, when the engine 22 is started, in a first step S1 the mechanism 114 detects the engine speed (such as received from an engine speed sensor) and stores the speed value as N1. After a predetermined amount of time in a step S2, the detection mechanism 114 detects the engine speed again and stores the value as N2.

In a step S3, the detection mechanism 114 subtracts the engine speed N1 from N2 and compares this value to a predetermined value. If the engine speed N2 exceeds N1 by more than the predetermined value, then in a step S5, it is determined that a condition of rapid acceleration exists (i.e. the engine speed has increased from N1 to N2 in the short period of time).

If the engine speed N2–N1 is not as great as the predetermined speed, then in a step S4 it is determined that rapid acceleration is not taking place and the loop restarts.

In the event rapid acceleration is detected (step S5), then as stated above, the exhaust timing valve 98 is moved towards its first or open position by an addition compensation amount θ.

Figure 5B:
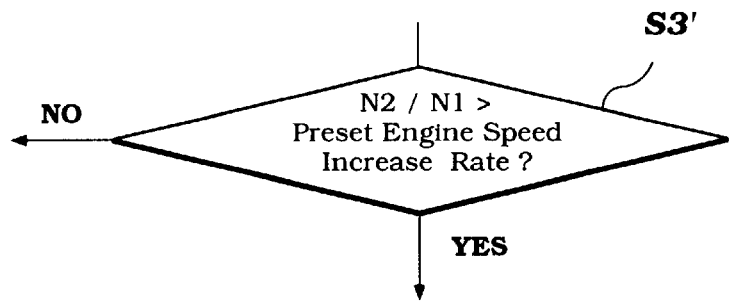

Referring to FIG. 5(b), step S3 in FIG. 5(a) may be replaced by step S3', wherein a condition of acceleration is determined by checking to see if the rate of change of engine speed N2/N1 is greater than a predetermined rate of change.

A second embodiment control arrangement in accordance with the present invention will be described with reference to FIG. 6. In this arrangement, the engine control includes one map for controlling the exhaust valve 98 position during normal (i.e., non-rapid acceleration) conditions, and a second map for controlling the exhaust valve 98 during a condition of detected acceleration.

Figure 6:
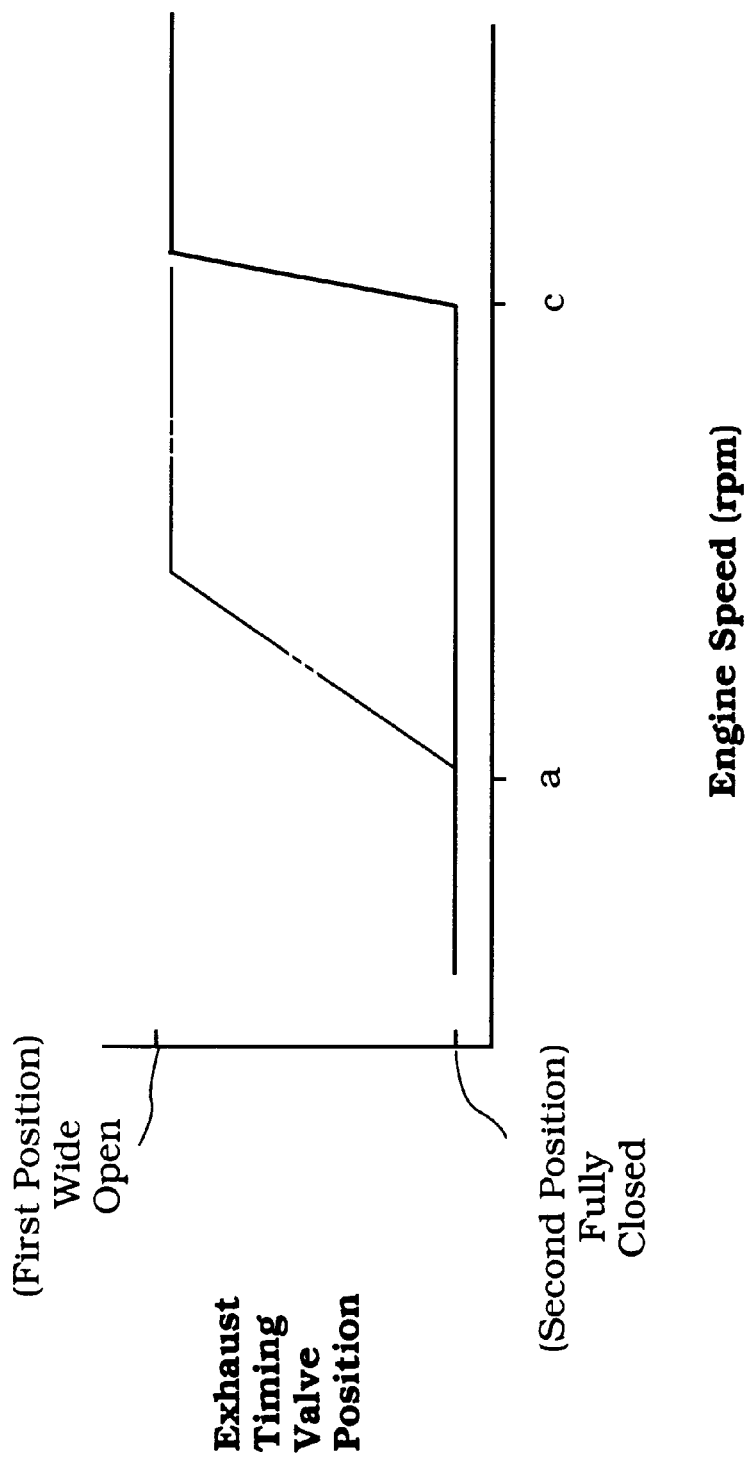
FIG. 6 is a graph illustrating an exhaust timing valve control strategy using the engine control in accordance with a second arrangement of the invention.

The solid line in FIG. 6 illustrates the exhaust timing valve 98 position as controlled by the engine control during normal engine operation. The dashed line in FIG. 6 illustrates the exhaust valve 98 position as controlled by the engine control during a condition of acceleration.

Figure 4B:
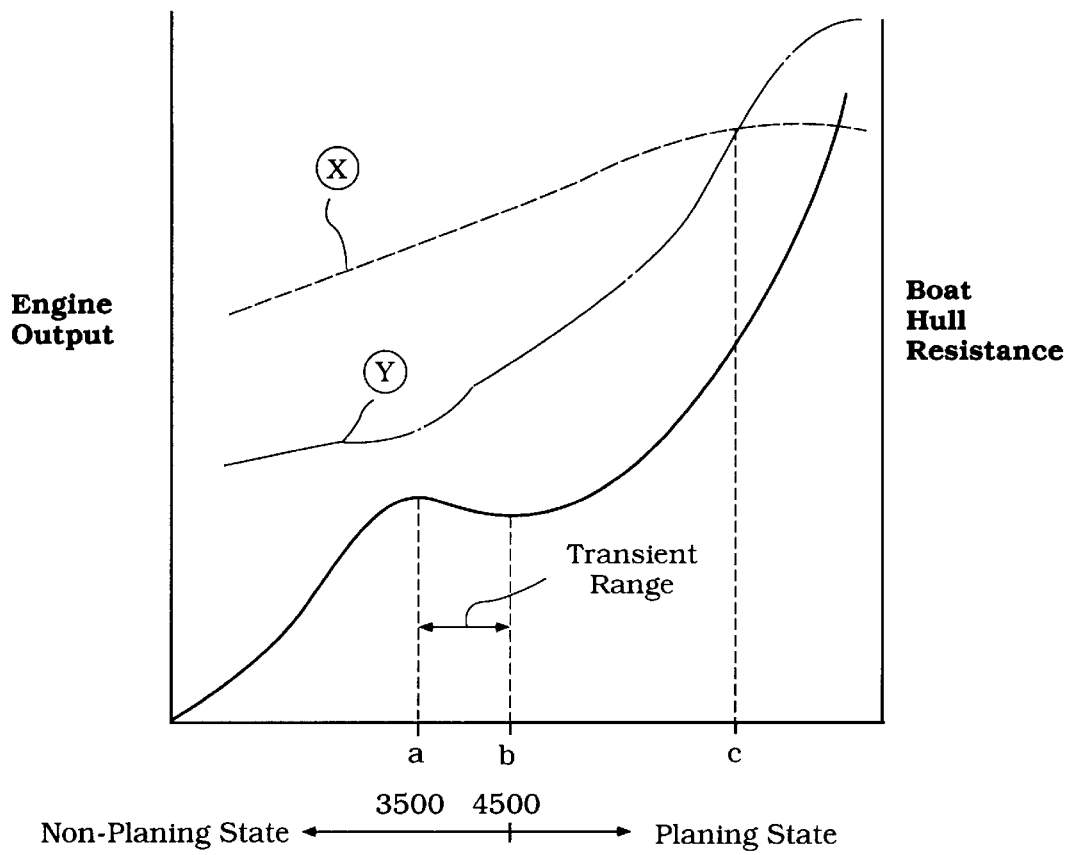
FIG. 4(b) is a graph illustrating engine output and boat hull resistance as they relate to engine speed.

As illustrated, the control is arranged to move the exhaust timing valve 98 to an open position upon detection of engine acceleration once the engine speed exceeds a speed which is less than engine speed c at which the valve would normally be opened. Preferably, this speed a is the speed (as illustrated in FIG. 4(b)) at which the watercraft 20 reaches the transient state (i.e. just before planing).

Preferably, the control moves the exhaust timing valve 98 to the open position during a condition of acceleration at a lower rate of opening speed than when the valve is opened at speed c under normal conditions. In this manner, exhaust gas restriction is alleviated, permitting good acceleration, and yet blow-by effects are somewhat limited, reducing harmful emissions at this lower engine speed.

Of course, the speed of the engine 22 at which the exhaust timing valve 98 is opened upon detection of acceleration (i.e. speed a in FIG. 6) may be at a variety of speeds less than speed c. For example, the speed a may be less than the transient speed. A somewhat high threshold speed is desired so that the valve is not opened at such a low speed that, even when acceleration is detected, stalling or the like might result.

This arrangement has the benefit that the exhaust timing valve 98 may be controlled to open at a different rate than the very fast rate which is normally employed, and the valve 98 may be arranged so that it only opens under a condition of acceleration until after the engine reaches a predetermined speed.

While the control 112 has been described in conjunction with the control of a single exhaust timing control valve 98, the description is meant to apply to the similar control of each valve 98 associated with the engine 22.

Further, while the particular valve 98 which has been described is of the sliding knife-type valve, those of skill in the art will appreciate that the exhaust timing valve may comprise a rotating or other valve which provides the same or similar exhaust flow timing control.

Of course, the foregoing description is that of preferred embodiments of the invention, and various changes and modifications may be made without departing from the spirit and scope of the invention, as defined by the appended claims.

What is claimed is:

1. An engine control for a planing-type boat having an engine powering a water propulsion unit, said engine having an exhaust port leading from a combustion chamber for routing exhaust products therefrom and an exhaust timing valve cooperable with said exhaust port and movable between a first position for delaying the closing of said exhaust port and a second position for advancing the closing of said exhaust port and means for moving said valve, said engine control arranged to control the position of said exhaust timing valve with said means for moving, said engine control including means for detecting a condition of acceleration of said engine, said engine control arranged to move said valve towards said first position when said means for detecting a condition of acceleration detects acceleration and a speed of said boat is below a planing speed.

2. The engine control in accordance with claim 1, wherein said engine control includes a valve position map and positions said valve under non-acceleration conditions in accordance with a normal value from said map and including means for adding a compensation amount to said normal value upon detection of a condition of acceleration.

3. The engine control in accordance with claim 1, wherein said engine control includes a first map providing valve position data when said means for detecting has not detected a condition of acceleration and a second map providing valve position data when said means for detecting detects a condition of acceleration.

4. The engine control in accordance with claim 3, wherein said engine control is arranged to control said valve in accordance with said second map once a speed of said engine exceeds a predetermined speed.

5. A method of controlling an exhaust timing valve of an engine powering a planing-type boat, said engine having at least one combustion chamber, an exhaust passage leading from said combustion chamber and said exhaust timing valve movable between a first open position and a second closed position in which said exhaust passage is obscured to a greater degree than when said valve is in said first position, comprising the steps of determining if a speed of said engine is accelerating, determining if a speed of said boat is below a planing speed, and moving said valve from said second towards said open position if said speed of said engine is accelerating and said speed of said boat is below said planing speed.

6. The method in accordance with claim 5, including an engine control for controlling said valve in accordance with position values from a control map, and further including the step of adding a compensating value to said position values when said speed of said engine is accelerating and said speed of said boat is below said planing speed.

7. The method in accordance with claim 5, including the steps of moving said valve in accordance with a first map when said engine is running in a first condition and moving said valve in accordance with a second map valve when said speed of said engine is accelerating.

8. The method in accordance with claim 5, including the step of detecting a speed of said engine and moving said valve towards said first position if said speed of said engine is accelerating, said speed of said boat is below said planing speed and said speed of said engine is above a predetermined speed.

9. An engine control for a planing-type boat having an engine powering a water propulsion device, said engine having at least one combustion chamber, an exhaust port leading from said combustion chamber, an exhaust timing valve cooperable with said exhaust port, said exhaust timing valve moveable between a first retracted position and a second extended position where in said second position a flow of exhaust through said exhaust port has a shorter duration than when said valve is in said first position, and a drive unit arranged to move said exhaust timing valve, said engine control including an engine acceleration detection mechanism, said engine control arranged to move said exhaust timing valve with said drive unit from said second position to said first position at a predetermine high engine speed, said engine control arranged to move said exhaust timing valve towards said first position with said drive unit when engine acceleration is detected and said speed of said engine is below said predetermined high speed.

10. The engine control in accordance with claim 9, wherein said drive unit includes an electric motor.

11. The engine control in accordance with claim 10, wherein said engine control includes an exhaust timing valve control unit controlling said motor.

12. The engine control in accordance with claim 9, wherein said engine control includes an exhaust timing valve position map, said engine control controlling said drive unit in accordance with said map.

13. The engine control in accordance with claim 9, wherein said predetermined speed is higher than a speed of said engine corresponding to a speed at which said boat planes.

14. The engine control in accordance with claim 9, wherein said engine control is arranged to move said exhaust timing valve towards said first position with said drive unit when said engine acceleration is detected and said engine speed is below an engine speed corresponding to a planing condition of said boat.

* * * * *